(12) United States Patent
Odenthal et al.

(10) Patent No.: US 7,210,368 B2
(45) Date of Patent: May 1, 2007

(54) ULTRASONIC WELDED PLASTIC RETAINER TO SECURE YOKE PLUG ADJUSTMENT

(75) Inventors: Frank Odenthal, Leverkusen (DE); Frank Peter Engels, Solingen (DE); Dirk Sickert, Bruehl (DE)

(73) Assignee: Automotive Components Holdings LLC, Dearborn, MI (US)

( * ) Notice: Subject to any disclaimer, the term of this patent is extended or adjusted under 35 U.S.C. 154(b) by 311 days.

(21) Appl. No.: 10/807,970

(22) Filed: Mar. 24, 2004

(65) Prior Publication Data
US 2004/0244518 A1    Dec. 9, 2004

(30) Foreign Application Priority Data
Mar. 24, 2003   (DE) ................... 103 13 134
Jul. 10, 2003   (DE) ................... 103 31 445

(51) Int. Cl.
*F16H 1/04* (2006.01)

(52) U.S. Cl. ..................... 74/422; 280/93.515

(58) Field of Classification Search ........... 74/388 PS, 74/496; 280/93.514, 93.515; 411/119, 120, 411/304, 910, 2, 372.5, 372.6, 373, 377
See application file for complete search history.

(56) References Cited

U.S. PATENT DOCUMENTS

| 719,745 | A | * | 2/1903 | Carlton ..................... 301/114 |
| 4,092,080 | A | * | 5/1978 | Bradley, Jr. ................. 403/319 |
| 4,602,521 | A | | 7/1986 | Bishop et al. |
| 5,597,278 | A | * | 1/1997 | Peterkort .................... 411/134 |
| 5,674,034 | A | * | 10/1997 | Bennett ...................... 411/197 |
| 5,718,149 | A | * | 2/1998 | Phillips ...................... 74/422 |
| 6,119,540 | A | * | 9/2000 | Phillips ...................... 74/422 |
| 2003/0115980 | A1 | * | 6/2003 | Sickert et al. ............... 74/409 |

FOREIGN PATENT DOCUMENTS

GB    2 174 474    5/1986

* cited by examiner

*Primary Examiner*—Thomas R. Hannon
*Assistant Examiner*—Justin Krause

(57) ABSTRACT

The toothed rack steering gear has an adjusting nut and a housing. An opening with internal thread of the housing is adapted to the adjusting nut and receives the adjusting nut in the assembled state. In the housing at least one recess is provided in direct proximity of the opening. A retainer is provided; it has a ring shaped body and at least one finger. The finger protrudes from this ring shaped body and can engage into the recess. The retainer has a back surface and the adjusting nut has a front surface. In the assembled state both are in contact. A connecting device is provided and secures the connection between the back surface and the front surface.

11 Claims, 2 Drawing Sheets

ULTRASONIC WELDED PLASTIC RETAINER TO SECURE YOKE PLUG ADJUSTMENT

BACKGROUND OF THE INVENTION

The invention refers to a toothed rack steering gear, as well as to a procedure for the production of such a toothed rack steering gear.

Toothed rack steering gears are used widely with motor vehicles, for the state of the art it is referred to GB 2174474 A and DE 3151835 C2. The known toothed rack steering gear has a housing, in this housing a pinion shaft is arranged and is rotatable around an axle. This pinion shaft is in connection with a toothed rack, which is lodged in the housing and can be adjusted in axial direction. An elastic means, which may also be designated as a counter-pressure mechanism, is provided; this means compensates the reaction forces between the pinion shaft and the toothed rack. It has a thrust piece and an adjusting nut, a compression spring is arranged there between. For the correct function the adjusting nut is adjusted in such a way that an adjusted play gap S is provided between the adjusting nut and the thrust piece.

The adjusting nut closes and locks the opening of the housing in the assembled state. The adjusting nut may therefore be designated as a locking nut. It usually has a drive portion; an adjusting tool can attach at that drive portion, for example a hexagonal wrench.

The adjusting nut must be fixed in the adjusted position and/or secured. Thus the adjusting nut is prevented to become unadjusted.

BRIEF SUMMARY OF THE INVENTION

The task of the present invention is to indicate a device and a procedure for a mechanical adjustment of the adjusting nut of the rack steering gear, which mechanical adjustment is sufficiently safe.

This task is solved by a toothed rack steering ear with an adjusting nut and with a housing, which housing has an opening with internal threads, which opening is adapted to the adjusting nut and receives the adjusting nut in the installed condition of the toothed rack steering gear. At least one recess is provided in the housing, which recess is in direct proximity of the opening. The recess can be an internal recess and/or an external recess. A retainer is provided, which retainer has a ring shaped body and further exhibits at least one finger, which finger a) protrudes from the ring shaped, b) is adapted to the recess and c) can engage into the recess. In case of more than one recesses the number of fingers is preferably equal to the number of recesses. The retainer has a back surface; the adjusting nut exhibits a front surface, in the assembled state the front surface of the adjusting nut is in contact with the back surface of the retainer. A connecting device is provided, which secures the connection between the back surface and the front surface in the assembled state.

The invention provides for a separate retainer, which is connected with the adjusting nut in the installed condition such that it forms a unit which the adjusting nut. This is the purpose of the connecting device. The fingers of the retainer hold and support themselves in the recesses of the housing, thereby preventing any rotary movement. In this way the adjusting nut is secured via the retainer and cannot be rotated.

The retainer has a ring shaped body, thereby the drive portion of the adjusting nut is freely accessible, and the retainer does not cover the drive portion. In this way an adjustment of the adjusting nut is possible even in a state, in which the retainer protrudes the adjusting nut. In particular the body of the retainer is ring-like disk-shaped.

Thus a subsequent release of the adjusting nut is possible, for example for a later repair of the rack steering gear. Because the retainer does not overlap the drive portion, the adjusting nut can be rotated again at any time. The retainer normally prevents and blocks any rotating motion. However, the retainer is made in such a way that it is destroyed, if a sufficiently high torque is applied at the drive portion, in particular its finger will break off in such a case. If the retainer is destroyed, the adjusting nut can be turned freely. For a following reassembly a new retainer is needed, generally also a new adjusting nut should be used.

The connecting devices can be started at purpose; a connection can be created at a desired time. The connecting devices can be implemented in various ways. Connecting devices adapted for ultrasonic welding have proven particularly suitable. For this either at the back surface of the retainer and/or at the front surface of the adjusting nut welding projections protrude, which cause an initial contact between back surface and front surface on a very small contact area in the form of a line or a dot. These welding projections are softened by applying ultrasonic power and merge with the opposite material of the adjusting nut and/or the retainer. Thereby a proper connection is created. Usual ultrasonic welding procedures can be used, as they are known from the state of the art. Advantageously adjusting nut and retainer are made of a plastic material, in particular both are manufactured from the same plastic, and this leads to a particularly favorable welded joint.

Furthermore the invention refers to a procedure for manufacturing a toothed rack steering gear, which exhibits the features according to the device claims, in particular the features of the device already discussed above, and further comprises the following process steps:

screwing the adjusting nut into the opening and into a preliminary position, which does not correspond yet to the final position, pushing the retainer onto the adjusting nut by pressing the fingers into the associated recesses, whereby the connecting devices come into direct proximity, however, still no connection are made, adjusting the adjusting nut into an adjusting position optimal for the toothed rack steering gear, and triggering the connecting devices, so that a mechanically fixed connection between retainer and adjusting nut is reached.

On an assembly line, first the adjusting nut can be screwed into the opening of the housing and the retainer can be pressed into the recesses, both parts are then fixed in such a way that they cannot fall out normally any longer. In a later stage of the assembly, the adjusting nut is then adjusted in such a way, as it is necessary for the normal attitude of the gear. The retainer can be connected to the adjusting nut directly afterwards, the connection is done with the help of the connecting devices.

Thus no additional parts are needed or must be provided when the adjusting nut is adjusted. The connection between the retainer and the adjusting nut is effected gently and without mechanical influence on the rotating position of the adjusting nut. Due to this fact there is no danger that during the securing of the adjusting nut a release of the connecting devices occurs, i.e. that the adjusting nut is rotated inadvertently. Practically no substantial mechanical forces are needed to establish the connection. The connection is, besides this, safe and durable. Finally, it can be broken and opened again, as has been described already above.

The release torque necessary for the destruction of the connection can be designed very exactly. The dimensions and other characteristics of the fingers can be indicated precisely, so that there is only a small variance from product to product.

The invention is suited in particular for power steering systems, in which the servo power is provided electrically, i.e., Electric Power Assisted Steering ("EPAS") systems. With these the requested manufacturing tolerances are rather small (for example regarding the parallelism of the teeth of the toothed rack). The invention makes it possible that the position of the adjusting nut is not modified or changed when fixing its rotating position, i.e. if it is connected with the retainer. This leads to improved characteristics of the steering gear in connection with small production costs.

Further advantages and characteristics of the invention will be appreciated from the following description of two embodiments of the invention which should not be interpreted in a limiting sense and which are going to be more precisely described with reference to the drawing in the following. The drawing shows in:

DETAILED DESCRIPTION OF THE INVENTION

Figure 1:
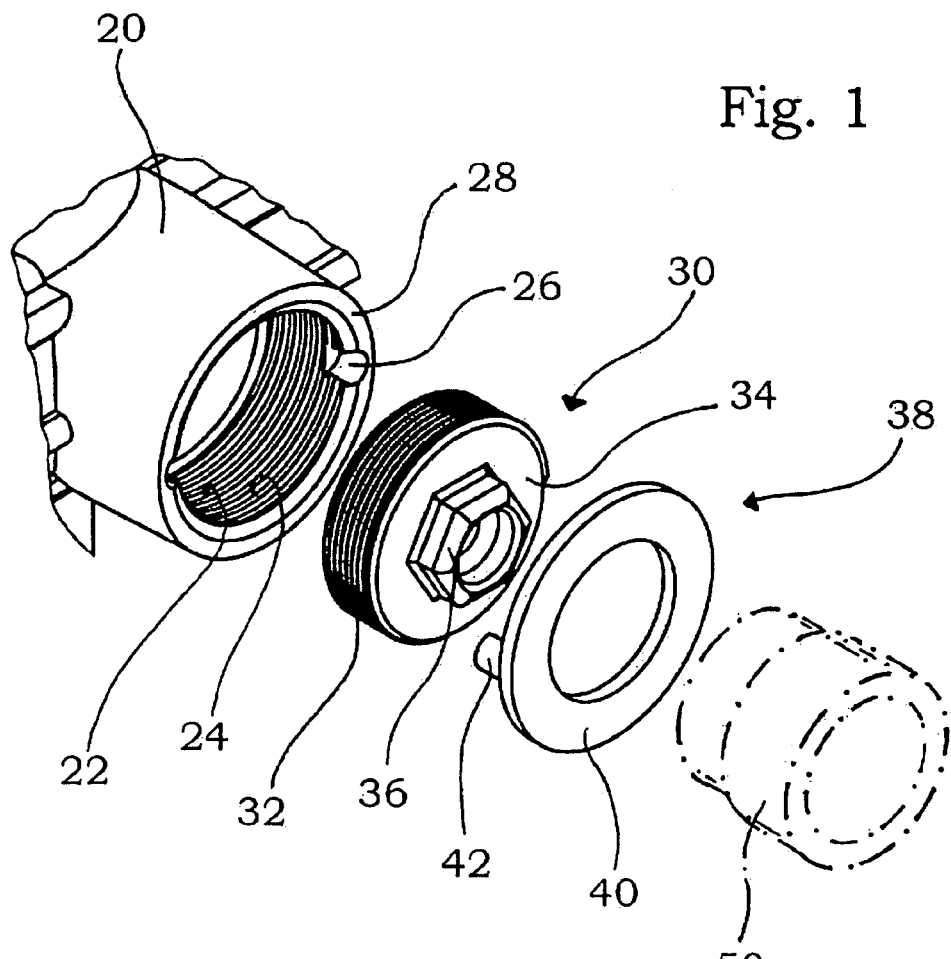
FIG. 1: a perspective representation of a portion of the housing, an adjusting nut, a retainer and a welding tool (only partially shown)

In FIG. 1 a portion of a housing 20 of a toothed rack steering gear is represented, as far as it is necessary for the explanation of the present invention. For the setting up and for the construction of the complete steering gear it is referred to the two references mentioned in the introductory part of the specification which references are incorporated by reference and form an integral part of the present specification.

The housing 20 has a portion in form of a tube and defines an opening 22. The opening 22 exhibits an internal thread 24. Two recesses 26 are provided in the direct range of the opening 22. They are accessible from a front face 28 of the housing 20, thus are open towards this front face. They are further open to an interior space of the opening 22. At a cylindrical jacket which delimits the internal thread 24, they adjoin the free interior space of the opening 22. The recesses 26 have an axial length, which is clearly shorter than the axial length of the internal thread 24 and lies for example between 10 and 40%, preferably for instance within approximately 30%, of the axial length of the internal thread 24. Seen in axial cross section the recesses 26 have the form of a semi-circle, whereby the roundness of the semi-circle shows radially outward.

In place of two recesses 26, which lie diametrically opposite, also several recesses 26 can be provided; preferably they are evenly distributed along the periphery.

In front of the opening 22 an adjusting nut 30 is shown, which in the embodiment shown essentially has the form of a flat cylinder. It has an external thread 32, which is adapted to engage the internal thread 24. It further has a front surface 34 oriented in the same direction as the front face 28 of the housing 20. In the center of this front surface 34 a drive portion 36 is provided. There a tool (not represented) can be attached in order to turn the adjusting nut 30. In the embodiment shown the drive portion is implemented as a hexagonal, which positively protrudes. Also a hexagon socket, a slot, a cross recessed heat etc. can be used.

Figure 2:
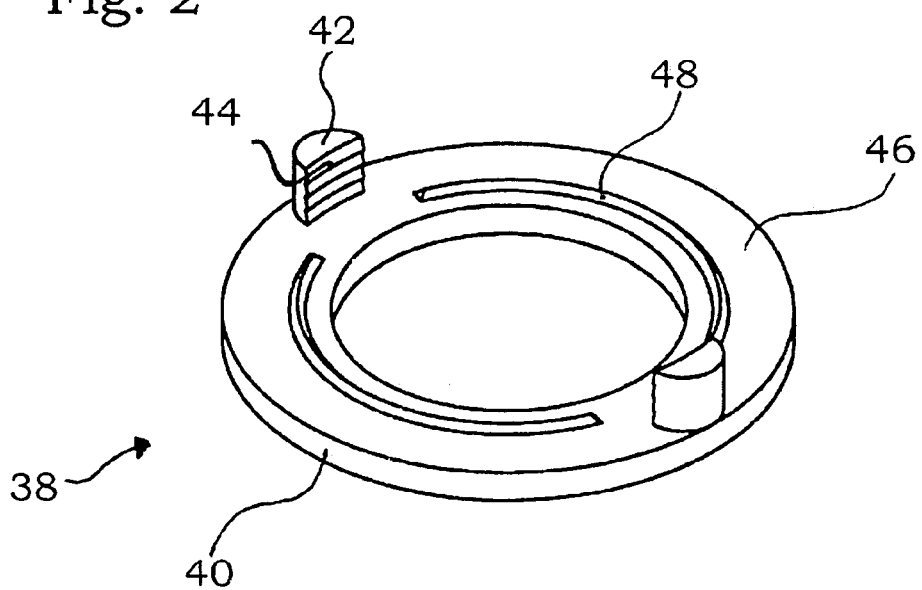
FIG. 2: a perspective representation of the retainer in accordance with FIG. 1 with view on its back surface.
Figure 3:
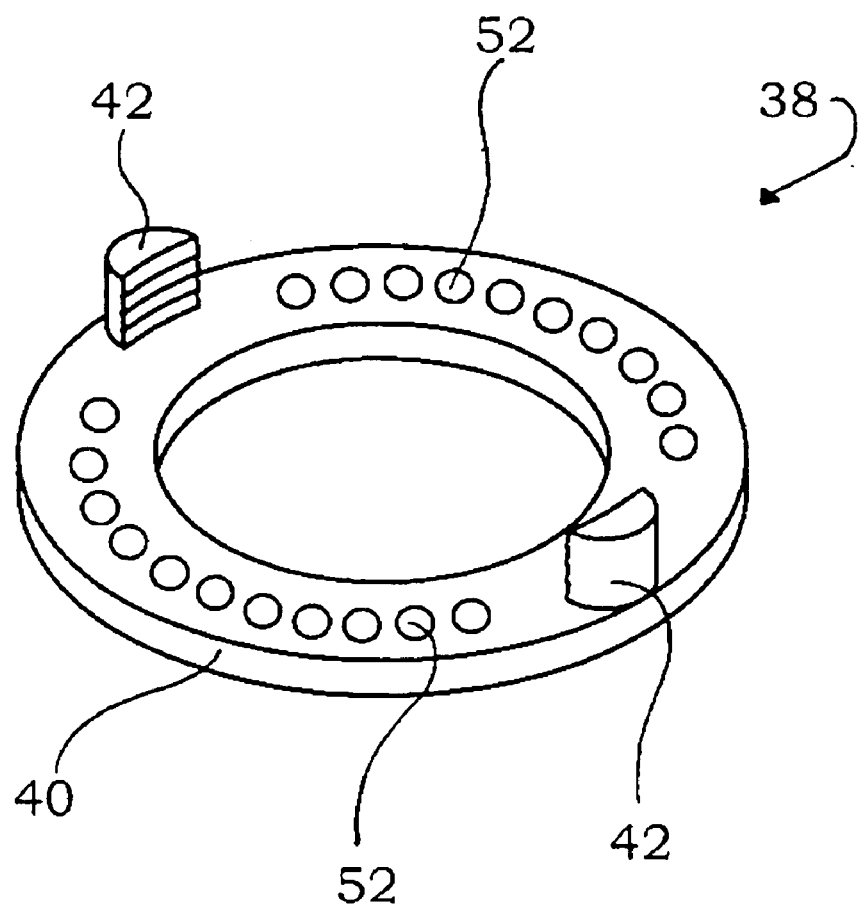
FIG. 3: a perspective representation as FIG. 2 of a retainer in a modified embodiment compared to FIG. 2.

In front of the adjusting nut 30 a retainer 38 is shown, which is also represented in FIGS. 2 and 3. It has a body 40 in the form of a disc shaped ring, similar to a washer, and in the embodiment shown has two fingers 42, protruding axially from this ring shaped body 40. The body 40 has an outside diameter, which more or less corresponds to the outside diameter of the adjusting nut 30. Further it has an inside diameter and defines an opening, which is large enough to allow free access to the drive portion 36. Preferably, a turning tool, when attached to the drive portion 36 extends through the opening of the body 40 and is not obstructed by the opening.

According to the number of recesses 26 and according to their shape, dimensions and arrangement, the fingers 42 are similarly embodied. They therefore have a cross section, which essentially corresponds to a semi-circle. They have an axial length, which is somewhat shorter than the axial length of the recesses 26, e.g. 50% to 10% shorter. The recesses 26 are identical in their construction. The fingers 42 are identically constructed.

After adjustment of the adjusting nut 30 within the opening 22, the position of the adjusting nut 30 is different from individual gear to individual gear. This means that also the fingers 42 are more or less inserted into the recesses 26. In the entire range, within which a regular adjustment is admitted, it is guaranteed that the fingers 42 are always inserted sufficiently deep into the recesses 26.

As FIG. 2 shows, the fingers have ribs 44 and/or retaining projections on their inner surfaces and the inner surfaces are facing each other. These ribs 44 and/or retaining projections are more or less conforming to the courses of the internal thread 24. They are also on the same cylinder as the courses of the internal thread. Thus a mechanical hold of the retainer 38 is possible at the adjusting nut 30 and in particular as the adjusting nut 30 is screwed into the opening 22. During installation of the retainer 38, with the adjusting nut 30 already being screwed in, the fingers 42 slip over the threads of the external thread 32 and a fixation of the retainer 38 is achieved.

The fingers 42 are so connected with the circular body 40 that they break off when applying a certain torque, which lies above the threshold value. This is favorable for a disassembly. In a preferred embodiment a rated break section, e.g. a notch, is provided for between each finger 42 and the circular body 40.

The retainer 38 serves to fix the proper rotated position of the adjusting nut 30 in the adjusted position. For this, connecting devices are provided, which allow for a fixed connection between retainer 38 and adjusting nut 30. The connecting device can be started purposefully; the connection comes into effect at a time, which can be predetermined exactly, following the intention of the user.

In the first embodiment of FIGS. 1 and 2 the connection between a back surface 46 of the retainer 38 and the front surface 34 of the adjusting nut 30 takes place with the ultrasonic welding. Ribs 48, also called welding protrusions, protrude forwards from the back surface 46 and extend concentrically around the retainer 38. Their cross section is more or less a triangle. The retainer 38 is manufactured from a plastic; likewise also the adjusting nut 30 is manufactured from plastic. Both plastic materials are preferably alike.

If the retainer 38 rests upon the adjusting nut 30, the points of the welding ribs 48 are in contact with the front surface 34. In order to provide for the connection, a welding tool 50 is attached from the outside onto the retainer. It is represented in dash-dotted lines in FIG. 1. On its frontal face the welding tool 50 has a ring, whose diameter is adapted to the diameter, on which the welding ribs 48 are arranged, and which can be subjected to ultrasonic movements. Thereby the points of contact of the welding ribs 48 with the front surface 34 are locally heated, this leads to a softening of the material and to melting and merging.

FIG. 3 shows an alternative embodiment. For this embodiment, balls 52 are provided in place of the welding ribs, these balls are micro-encapsulation of adhesive. Each ball contains a small amount of an adhesive. The shell of the balls can be destroyed with mechanical pressure or, for example, also under the effect of ultrasonic welding, so that then the adhesive becomes released. Then the desired connection between retainer 38 and adjusting nut 30 is purposefully released and reached. Other forms of connecting devices are also possible.

In the following the method of the production of the steering gear is described: It is assumed that the production takes place on an assembly belt and/or an assembly-line. In a first step an adjusting nut 30 is screwed in into the opening 22 of the housing. Its rotating position does not correspond yet to the later final position. Then a retainer 38 is pushed onto the adjusting nut. It is fixed due to the reciprocal effect of its fingers 42 with the external thread 32, and has, thus, a sufficiently safe provisional hold.

In a later step of the assembly, that may be relatively far from the first step, the adjusting nut 30 is then adjusted, this can for example be performed by a robot. Subsequently, and preferably immediately afterwards, the connecting device is started or triggered, for example by ultrasonic welding of the retainer 38 and the adjusting nut 30. During the ultrasonic welding the position of the adjusting nut 30 remains unchanged. Herein lies a special advantage. An appropriate advantage is also reached during purposeful release of a rapidly working adhesive or connecting means, which is arranged between the adjusting nut 30 and the retainer 38.

The at least one recess can alternatively be arranged at the retainer 38, the housing 20 then carries the at least one finger.

We claim:

1. A toothed rack steering gear assembly comprising:
an adjusting nut having external threads;
a housing having portions defining an opening with internal threads, the opening adapted to the adjusting nut so as to receive the adjusting nut-threaded therein in an assembled state of the rack steering gear assembly, at least one recess being provided in the housing, the recess being in direct proximity of the opening;
a separate retainer having a ring shaped body and further having at least one finger protruding from the ring shaped body, the finger corresponding to the recess and being located and positioned in the recess, the at least one recess and the at least one finger corresponding in number;
the retainer further including a back surface and the adjusting nut further including a front surface, in the assembled state the front surface of the adjusting nut being in contact with the back surface of the retainer, the adjusting nut and the retainer being fixedly and securely connected to each other between the back surface and the front surface in the assembled state of the assembly.

2. The toothed rack steering gear assembly according to claim 1, wherein the at least one recess is open in a direction of the internal threads.

3. The toothed rack steering gear assembly according to claim 1, wherein the at least one finger defines an inner surface corresponding with the internal threads, projections being formed on the inner surface of the at least one finger.

4. The toothed rack steering gear assembly according to claim 1, wherein the at least one finger is connected with the ring shaped body and has the property that when applying a torque above a threshold value to the ring shaped body the at least one finger in the at least one recesses breaks off.

5. The toothed rack steering gear assembly according to claim 1, wherein in an axial direction the at least one recess extends only over a sub-range of an axial length of the internal threads so that, starting from a front surface of the housing, there is an unimpaired part of the internal thread beyond the at least one recess, and wherein an axial length of the external thread of the adjusting nut is larger than an axial length of the at least one recess.

6. The toothed rack steering gear assembly according to claim 1, wherein the retainer and adjusting nut are fixedly connected by an ultrasonically meltable rib that protrudes from one of the back surface or the front surface and which during an ultrasonic welding melts and effects a rigid connection.

7. The toothed rack steering gear assembly according to claim 1, wherein the retainer and adjusting nut are fixedly connected by an adhesive.

8. The toothed rack steering gear assembly according to claim 1, wherein the retainer and adjusting nut are fixedly connected by an encapsulated adhesive.

9. The Toothed rack steering gear assembly according to claim 1, wherein the retainer and adjusting nut are fixedly connected by connecting devices that cause a connection between the back surface and the front surface at a desired point in time.

10. The toothed rack steering gear assembly according to claim 1, wherein the adjusting nut includes a drive portion enabling adjustment of the adjusting nut relative to the housing, the drive portion being positioned within an opening defined by the ring shaped body of the retainer.

11. The toothed rack steering gear assembly according to claim 10, wherein the drive portion is a multi point driving head.

* * * * *